March 15, 1927.
W. H. ORPEN
1,620,682
APPARATUS FOR SUPPORTING VEHICLE LOADS
Filed July 25, 1921
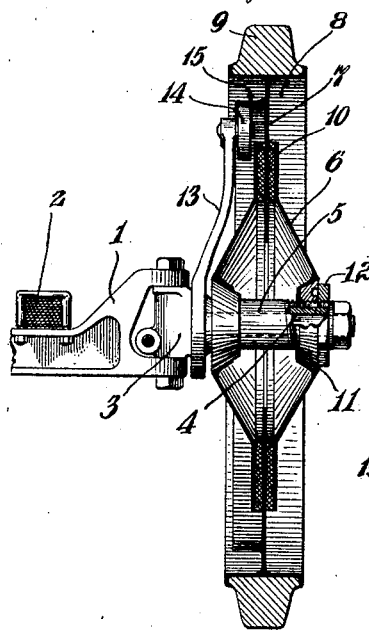
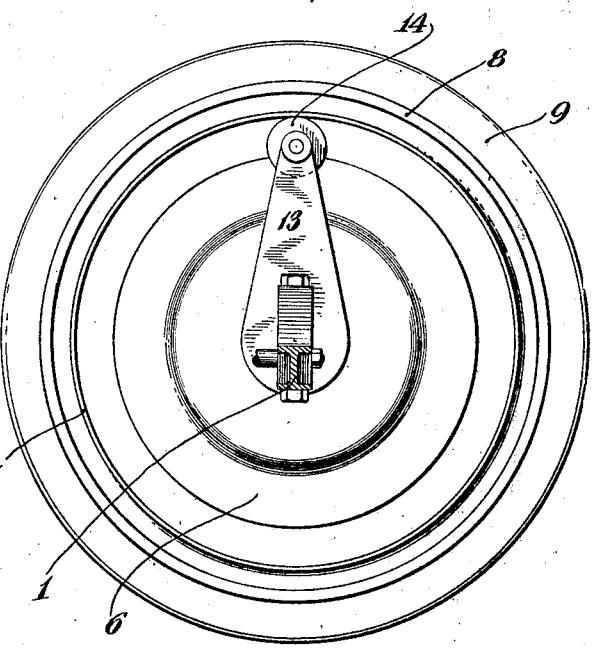
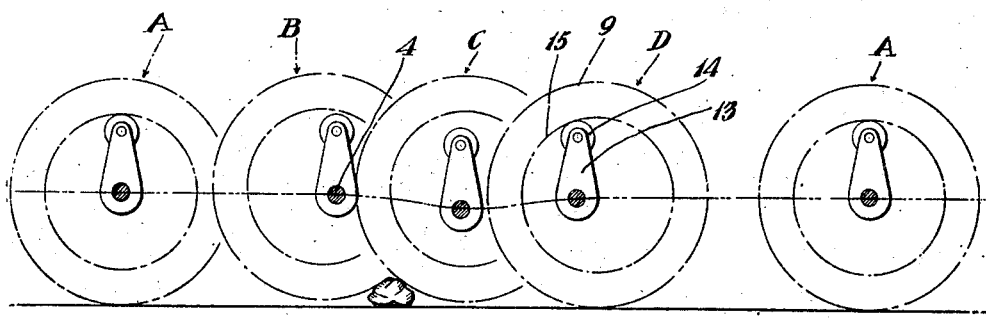
Inventor
William H Orpen
By His Attorneys
Jeffery, Kimball & Eggleston Patented Mar. 15, 1927.

1,620,682

UNITED STATES PATENT OFFICE.

WILLIAM H. ORPEN, OF BROOKLYN, NEW YORK.

APPARATUS FOR SUPPORTING VEHICLE LOADS.

Application filed July 25, 1921. Serial No. 487,361.

The broad object of my invention is the reduction of road vibration in vehicles by the elimination, in supporting vehicle loads, of the objectionable rebound incident to the use of springs and but partially obviated by the shock absorbers of many varieties so commonly associated with springs in vehicle and particularly in motor vehicle construction. In accomplishing my purpose of softening the shock of impact without incurring such objectionable rebound, I make the restoration substantially independent of the displacement in the sense that the means for effecting the former offers substantially no active opposition to the latter, there being no storing up of energy of impact save to such extent as springs may also be present in the suspension. Discarding springs as the sole or principal means for restoring the load to normal position and using them, if at all, only in a subordinate or auxiliary capacity, I rely on certain principles hereinafter disclosed preferably embodying a frictional support, duly regulated in accordance with the nature and weight of the vehicle or the use to which it is to be put, for restraining as well as for permitting movement of the load both out of and back to normal position, when the vehicle encounters an obstacle causing a shock impact, and I restore the load to normal position under frictional restraint and without dominating spring action. Furthermore I cause this return to take place as a necessary consequence of the rolling of the wheel in the continued travel of the vehicle or otherwise so that the parts are restored by the application of force from the vehicle motor.

My invention thus represents a radical departure from substantially universal practice and both as a process and as an apparatus is based on and embodies a broadly new principle, to-wit, that the load of a vehicle may be yieldingly supported with the requisite flexibility, yet without objectionable rebound due to storing up of energy of impact, by the use of frictionally engaged members which yield to shocks above a certain value, the movement of the load both out of and back to normal position being under frictional restraint and being essentially a dead or inelastic movement, that is a movement in which spring action, if a factor at all, is not the dominant factor. But it is to be understood that while I prefer not to depend on springs for the action referred to, the association with said frictionally engaged members of a spring or springs in such a way as to modify, without essentially changing, their characteristic action is to be regarded as within my invention.

The process by which this principle is carried out may be said to consist in reducing road vibrations in vehicles by sustaining the load frictionally with capability of substantially dead or non-resilient movement when the vehicle encounters obstacles causing shocks, and when such movement has occurred returning the load on the continued travel of the vehicle gradually and also with substantially dead and frictionally restrained movement and preferably by a positive application of force.

The apparatus by which the process may be carried out is subject to wide variation as to form expressing as it does concretely the broad principle set forth above. For this reason and since no attempt is herein made to exhaust the possibilities in this direction, as by showing in the drawing a great number of constructions, emphasis must be laid on the fact that the single selected embodiment exhibits only one type, though it is the present preferred type, of the apparatus and one which may itself be varied within the broad limits of the invention. While it is preferred to locate the point of yielding frictional support between the hub and the rim of the wheels, and while the construction illustrated is an instance of this arrangement, this, in a broad sense, is not essential, it being only necessary to locate the frictionally engaged members at some point between the load and its ultimate support, i. e. the wheel rims, whether they are rigid with the hubs or movable with reference thereto. The breadth of the invention thus considered is evident and it is also clear that it lies in the field of vehicle suspension as well as in that of vehicle wheels and may evidently be embodied in a wide variety of structures having substantial differences.

In the single sheet of drawings which as stated illustrates more or less diagrammatically one form my apparatus may take, Fig. 1 is a central vertical section, in the plane of the front axle, of a wheel and adjacent parts;

Fig. 2 a section at right angles to that of Fig. 1, and Fig. 3 a diagrammatic view illustrating the operation of the wheel shown in the other two figures.

In these drawings the yielding frictional support is between the axle and the wheel rims as will appear more clearly in the detailed description, the function of which is explanatory rather than specifically limiting. The axles which term is inclusive of axle housings are regarded as part of the vehicle frame, that term being of broad significance as used herein. The front axle 1 to which may be secured suitable vehicle springs 2, if desired, is provided with the steering knuckle 3 having a stub axle 4 on which is rotatably mounted the hub 5, mutually engaged friction surfaces being carried by the hub and by the rim, frictionally engaged members being thus interposed between the load and wheel rim. In the construction illustrated the hub carries spaced disks 6 secured thereto and embracing a considerable portion of the annular web 7, carried by the wheel rim 8, the disks thus constituting one member of a frictionally engaged pair and the web 7 the other. It is evident that more than one set of frictionally engaged members may be used. The rim may have a rubber tire 9. The inner sides of the discs 6, or both sides of the annular web 7 are faced with frictional material such as brake lining fabric 10 and the friction members are appropriately pressed together. It will be apparent that with this arrangement, the rim may move, against the friction, in any direction in its own plane with reference to its hub, and that the direction and extent of such movement will vary according to the nature of the particular shock impact. By means of the nut 11 threaded to the wheel hub, and the lock nut 12 the pressure of the frictional contact between the frictionally engaged members may be varied and in this way the value of the shocks above which the rim will yield with reference to the hub may be set at any amount adequate to support the load when the car is at rest or suitable to the load and character of service. It will be understood that relative rotation between the frictionally held members will be prevented or limited. Furthermore, all necessary adjustments customarily found in automobile wheel construction can be supplied. The structure as thus far described provides for a dead or inelastic movement out of normal position on shocks above a fixed value being sustained.

In accomplishing the restoration of the wheel rim to its normal position after it has yielded under shock impact, I make use of restoring means having a member rotatable with the wheel rim and another member adapted to co-operate therewith and mounted on a part of the vehicle other than the wheel, the return thus effected being also substantially dead or inelastic. The illustrated means for returning the parts consists of co-operating members having characteristically the nature respectively of track and guide, one of which may move out of contact with the other, displacement not being opposed by the restoring means. One of these members is shown as a track concentric with the rim and normally concentric with the axle and the other as a contact member, one being rotatable with the wheel and the other fixed to the running gear frame, which term is used broadly as designating the axle or some other fixed part of the vehicle which does not rotate with the wheel. When the rim has been displaced by a shock into an eccentric position, the continued rolling of the wheel will cause these track and contact members eventually to come into contact and restore the wheel rim to concentric position as the vehicle travels, the movement being effected gradually and being the compound result of the movement of rotation of the wheel about the axis of the wheel axle 4 as well as the movement of rotation of the track about its own axis and other related non-resilient movements. In the drawings the fixed member is a bracket 13 and an anti-friction roller 14, the bodily movable member being the track 15 carried by the web 7 concentrically to the wheel rim 8. The fixed member may be variously located to permit the separation from it, of the track member, under the shock pressure and is shown as above the hub in a position not to interfere with the displacement and restoration of the wheel rim. Location in the vertical plane of the axis may be preferred since it meets the requirements equally in both directions of travel, and in practice it is found that a position somewhat forward of said plane is quite satisfactory.

The operaton of the apparatus, if not clear already, will appear on reference to Figure 3, wherein successive positions of the wheel are roughly indicated by dot and dash lines, the axle and bracket being in solid lines, but this is only a general representation and does not purport to indicate the exact positions or relations of the parts. It will be observed that the inner dot and dash circle represents in each instance the circular track. The several wheel positions from left to right in said figure have been designated by the letters A, B, C, D, A, the first and last representing the normal position of the wheel when the vehicle is stationary or running over smooth ground which does not produce shocks sufficient to cause the frictionally engaged members to slip. B indicates the position of the wheel just as it strikes and begins to surmount an obstacle and shows the wheel rim responding to force exerted in a direction upward and backward and moved into a position eccentric with reference to the axle. Some displacement of the load will have occurred by or following this rim displacement and as the vehicle moves forward, the rim tends to resume its centralized position. The position of the wheel as the obstacle is about to be left behind is indicated at C where the rim is still eccentric. Continued movement eventually returns the rim to concentric, and the load to normal, position, the movement being compounded of various motions as heretofore stated, but such return is relatively gradual and without objectionable tendency to pass or exceed its normal position, that is to say, the return is effected under frictional restraint substantially without excess motion, or in the event of excess motion it is slight in amount and of low and hence unobjectionable velocity. It will of course be appreciated that the action just analyzed is continually recurring and that in practice the wheel rim is in more or less constant motion playing about the axis of the axle, but is constantly within the recentralizing action of the restoring means.

Claims—

1. The combination in apparatus for supporting vehicle loads of means for supporting the load and permitting displacement under shock impact, and means for restoring the load whenever displaced by road inequalities and which offer substantially no opposition to the displacing movement.

2. Apparatus for supporting the load of a wheeled vehicle comprising frictionally engaged members interposed between the load and a wheel rim and subject to displacement under shock impact, incident to inequalities of the road, and positive means also interposed between the load and wheel rim for restoring said frictionally engaged members, whenever thus displaced, by the continued travel of the vehicle.

3. Apparatus for supporting vehicle loads comprising a wheel having a hub, a rim bodily movable with respect to the hub, and frictionally engaged surfaces interposed between said hub and rim which are subject to displacement under shock impact, means for adjusting the degree of friction, and centering means for returning the wheel rim to normal concentric position comprising a member rotatable with the wheel rim and a relatively fixed member adapted to co-operate therewith.

4. Apparatus for supporting vehicle loads comprising wheels having hubs, rims bodily removable with respect to the hubs, and frictionally engaged surfaces interposed between said hubs and rims which are subject to displacement under shock impact, and freely separable guide and track members, one of which is fast to the frame and the other rotatable with the wheel rim, and which separate when such a shock is sustained but are returned into contact and co-operate to restore the frictionally engaged members on the continued rolling of the wheel.

5. Apparatus for supporting vehicle loads comprising wheels having hubs, wheel rims and frictionally engaged members interposed between said hubs and rims and yieldable under shock impact to allow the rims restrained movement into positions of eccentricity with reference to the axle, and means for positively returning the wheel rims to concentric position on continued travel of the vehicle, said means having a member rotatable with the wheel rim and another member adapted to co-operate therewith and mounted on a part of the vehicle other than the wheel.

6. In apparatus for supporting vehicle loads, a wheel having a hub and a wheel rim bodily movable with reference thereto, one of said parts being provided with an annular web and the other with a pair of opposed spaced discs embracing said web and in frictional engagement therewith, frictional material as brake lining being interposed between said plates and web to secure frictionally restrained movement between the parts, a guide member and a track normally concentric with the axle, one of which rotates with the wheel rim and the other of which is fast to the vehicle frame for restoring the wheel rim to position under frictional restraint on the continued rotation of the wheel.

7. In apparatus for supporting vehicle loads, a wheel having a hub and a wheel rim bodily movable with reference thereto, one of said parts being provided with an annular web and the other with a pair of opposed spaced discs embracing said web, and in frictional engagement therewith, frictional material as brake lining being interposed between said plates and web to secure frictionally restrained movement between the parts, a guide member, a track normally concentric with the axle, one of which rotates with the wheel rim and the other of which is fast to the vehicle frame for restoring the wheel rim to position under frictional restraint on the continued rotation of the wheel, and means for moving the discs toward or from each other to increase or decrease the grip of the discs on the web.

8. In apparatus for supporting vehicle loads, a wheel having a hub, a rim and frictionally engaged members interposed between said hub and rim and yieldable under shock impact to allow the rim restrained movement into positions of eccentricity with reference to the axle, a track surface turning with the wheel rim, and a bracket fixed to the axle and having a roller co-operating with said surface to return the wheel rim to concentric position.

9. Apparatus for supporting the load of a wheeled vehicle comprising frictionally engaged members interposed between the load and a wheel rim and subject to displacement under shock impact incident to irregularities of the road, and means independent of said frictionally engaged surfaces acting to restore said frictionally engaged members by the effect of the continued travel of the vehicle.

In testimony whereof, I have signed this specification.

WILLIAM H. ORPEN.